(12) United States Patent
Shuk et al.

(10) Patent No.: US 12,281,999 B2
(45) Date of Patent: Apr. 22, 2025

(54) IN-SITU OXYGEN ANALYZER WITH SOLID ELECTROLYTE OXYGEN SENSOR AND ANCILLARY OUTPUT

(71) Applicant: Rosemount Inc., Shakopee, MN (US)

(72) Inventors: Pavel Shuk, Copley, OH (US); Chad M. McGuire, Shakopee, MN (US); Matthew Theisen, Shakopee, MN (US); Philip Ostby, Cologne, MN (US)

(73) Assignee: Rosemount Inc., Shakopee, MN (US)

( * ) Notice: Subject to any disclaimer, the term of this patent is extended or adjusted under 35 U.S.C. 154(b) by 1010 days.

(21) Appl. No.: 17/129,049

(22) Filed: Dec. 21, 2020

(65) Prior Publication Data

US 2021/0148853 A1 May 20, 2021

Related U.S. Application Data

(63) Continuation-in-part of application No. 16/535,741, filed on Aug. 8, 2019, now abandoned, which is a
(Continued)

(51) Int. Cl.
*G01N 27/416* (2006.01)
*G01N 27/407* (2006.01)

(52) U.S. Cl.
CPC ....... *G01N 27/416* (2013.01); *G01N 27/4075* (2013.01)

(58) Field of Classification Search
CPC .......... G01N 27/4074; G01N 27/4077; G01N 27/4065
See application file for complete search history.

(56) References Cited

U.S. PATENT DOCUMENTS

| 3,981,785 A | 9/1976 | Sandler |
| 4,030,349 A | 6/1977 | Blanke et al. |

(Continued)

FOREIGN PATENT DOCUMENTS

| EP | 1327880 A2 | 7/2003 |
| GB | 1523214 A | 8/1978 |

(Continued)

OTHER PUBLICATIONS

Shuk, P. and McGuire. C., 2017. Carbon monoxide gas sensing technologies in combustion process. Sensors & Transducers, 217(11), pp. 1-13.
(Continued)

*Primary Examiner* — Natalia Levkovich
(74) *Attorney, Agent, or Firm* — Christopher R. Christenson; Kelly, Holt & Christenson, P.L.L.C.

(57) ABSTRACT

An improved oxygen analyzer includes a controller configured to receive an oxygen sensor signal and provide an oxygen concentration output. A probe is configured to extend into a source of combustion process gas. An oxygen sensor is disposed within the probe and has a sensing electrode mounted to one side of a solid electrolyte and a reference electrode mounted to an opposite side of the solid electrolyte. The oxygen sensor has catalytic beads that are configured to be disposed between the process gas and the sensing electrode. Measurement circuitry is operably coupled to the oxygen sensor and the controller and is configured to provide the controller with the oxygen sensor signal based on an electrical response of the oxygen sensor. The controller is configured to detect a behavior of the oxygen sensor concentration output over time to provide at least one ancillary output.

20 Claims, 15 Drawing Sheets

Related U.S. Application Data continuation of application No. 14/788,203, filed on Jun. 30, 2015, now abandoned.

(56) References Cited

U.S. PATENT DOCUMENTS

| | | | |
|---|---|---|---|
| 5,498,487 | A | 3/1996 | Ruka et al. |
| 5,795,545 | A | 8/1998 | Koripella et al. |
| 6,484,563 | B1 | 11/2002 | Enquist et al. |
| 7,270,731 | B2 | 9/2007 | Lehmann et al. |
| 7,886,523 | B1 | 2/2011 | LeGare |
| 2003/0127325 | A1 | 7/2003 | Khesin et al. |
| 2004/0026268 | A1 | 2/2004 | Maki et al. |
| 2004/0134781 | A1* | 7/2004 | Shuk ............... G01N 27/4075 204/426 |
| 2005/0235631 | A1 | 10/2005 | Schumann |
| 2009/0044598 | A1 | 2/2009 | Kuisell et al. |
| 2013/0145814 | A1 | 6/2013 | Bailey |
| 2014/0338422 | A1 | 11/2014 | Nemer et al. |
| 2017/0003246 | A1 | 1/2017 | Shuk et al. |
| 2019/0360963 | A1 | 11/2019 | Shuk et al. |

FOREIGN PATENT DOCUMENTS

| | | |
|---|---|---|
| JP | S58168814 A | 10/1983 |
| JP | 2000501512 A | 2/2000 |
| JP | 2000088790 A | 3/2000 |
| JP | 2002181767 A | 6/2002 |
| JP | 3435836 B2 | 8/2003 |
| JP | 2003222607 A | 8/2003 |
| JP | 2003240751 A | 8/2003 |
| WO | 2015095884 A1 | 6/2015 |
| WO | 2018123308 A1 | 7/2018 |

OTHER PUBLICATIONS

Esler. M.B., Griffith, D.W., Wilson, S.R. and Steele, L.P., 2000. Precision trace gas analysis by FT-IR spectroscopy. 1. Simultaneous analysis of $CO_2$, $CH_4$, $N_2O$, and CO in air, Analytical Chemistry, 72(1), pp. 206-215.
Shuk, P., Bailey, E., Zosel, J. and Guth, U., 2009. New advanced in situ carbon monoxide sensor for the process application. Ionics. 15(2), pp. 131-138.
Linnerud, I., Kaspersen, P. and Jaeger, T., 1998. Gas monitoring in the process industry using diode laser spectroscopy. Applied Physics B. Lasers & Optics, 67(3).
Lackner, M., 2008. Gas sensing in industry by tunable diode laser spectroscopy (TDLS). Reviews in Chemical Engineering, 23(2), pp. 1-115.
Park, J.Y., Azad, A.M., Song, S.J. and Wachsman, E.D., 2010. Titania-Based Miniature Potentiometric Carbon Monoxide Gas Sensors with High Sensitivity. Journal of the American Ceramic Society, 93(3), pp. 742-749.
Retrieved at "www.lamtec.de/en/produkte/combustion-optimization/carbosen.html" Retrieved on Jan. 21, 2021, LAMTEC Measurement and control technology for firings GmbH & Co. KG, 2 pages.
Shuk, P., 2010. Process Zirconia Oxygen Analyzer—State of ArtZirkondioxid-Sauerstoffsensoren—Stand der Technik. tm-Technisches Messen, 77(1), pp. 19-23.
Docquier, N. and Candel, S., 2002. Combustion control and sensors: a review. Progress In energy and combustion science, 28(2), pp. 107-150.
Göpel, W. and Schierbaum, K.D., 1995. $SnO_2$ sensors: current status and future prospects. Sensors and Actuators B: Chemical, 26(1-3), pp. 1-12.
Miura, N., Lu, G. and Yamazoe, N., 2000. Progress in mixed-potential type devices based on solid electrolyte for sensing redox gases. Solid State Ionics, 136, pp. 533-542.
Garzon, F.H., Mukundan, R. and Brosha, E.L., 2000. Solid-state mixed potential gas sensors: theory, experiments and challenges. Solid State Ionics, 136, pp. 633-638.
Barsan, N., Stetter, J.R., Findlay, M. and Göpel, W., 2000. High performance gas sensing of CO: comparative tests for ($SnO_2$-based) semiconducting and for electrochemical sensors. Sensors and Actuators B: Chemical, 66(1-3), pp. 31-33.
Barsan, N., Koziej, D. and Weimar, U., 2007, Metal oxide-based gas sensor research: How to?. Sensors and Actuators B: Chemical, 121(1), pp. 18-35.
Miura, N., Raisen, T., Lu. G. and Yamazoe, N., 1998. Highly selective CO sensor using stabilized zirconia and a couple of oxide electrodes, Sensors and Actuators B: Chemical, 47(1-3), pp. 84-91.
Fergus, J.W., 2007, Solid electrolyte based sensors for the measurement of CO and hydrocarbon gases, Sensors and Actuators B: Chemical, 122(2), pp. 683-693.
Baukal Jr, C.E., 2010, Industrial combustion testing. Taylor and Francis.
Anggraini, S.A., Plashnitsa, V.V., Elumalal, P., Breedon, M. and Miura, N., 2011. Stabilized zirconia-based planar sensor using coupled oxide (+ Au) electrodes for highly selective CO detection. Sensors and Actuators B: Chemical, 160(1), pp. 1273-1281.
Communication Under Rule 71(3) EPC for European Patent Application No. 16818456.2, dated Oct. 7, 2020, 34 pages.
"6888 In Situ Flue Gas Oxygen Transmitter". 6888 Oxygen Transmitter CMB_PDS_6888, Product Data Sheet, Apr. 2014, Emerson Process Management, available at: <RosemountAnalytical.com> 16 pages.
International Search Report and Written Opinion for International Patent Application No. PCT/US2016/038007, date of mailing: Sep. 27, 2016, date of filing: Jun. 17, 2016, 16 pages.
First Office Action dated Mar. 30, 2018, for Chinese Patent Application No. 201510933981.X, 24 pages including English Translation.
European Search Report dated Nov. 9, 2018, for European Patent Application No. 16818465.2. 11 pages.
Japanese Office Action dated Nov. 13, 2018, for Japanese Patent Application No. 2017-567394, 6 pages including English Translation.
Second Office Action dated Nov. 26, 2018, for Chinese Patent Application No. 201510933981.X. 15 pages including. English Translation.
Jaume Folch et al.: "Solid Electrolyte Multisensor System for Detecting O2, CO, and NO2" Journal of the Electrochemical Society, vol. 154, No. 7, May 11, 2007, 8 pages.
Can et al. (Zhang Yi Can, Hidekazu Narita, Junichiro Mizusaki, Hiroaki Tagawa, Detection of carbon monoxide by using zirconia oxygen sensor, Solid State Ionics 79 (1995) 344-348).
International Search Report and Written Opinion dated Mar. 21, 2022 for International Patent Application No. PCT/US2021/060768, 12 pages.
First Office Action for Japanese Patent Application No. 2023-537573, dated May 7, 2024, 9 pages including English Translation.
Supplementary Search Report for European Patent Application No. 21911855.1, dated Oct. 9, 2024, 9 pages.
Office Action for Chinese Patent Application No. 202111563759.7, dated Oct. 15, 2024, 16 pages including English Translation.
Second Office Action Chinese Patent Application No. 202111563759.7, dated Feb. 13, 2025, 14 pages including English Translation.

* cited by examiner

IN-SITU OXYGEN ANALYZER WITH SOLID ELECTROLYTE OXYGEN SENSOR AND ANCILLARY OUTPUT

CROSS-REFERENCE TO RELATED APPLICATIONS

The present application is a continuation-in-part of and claims priority of U.S. patent application Ser. No. 16/535,741, filed Aug. 8, 2019, which application is a continuation of and claims priority of U.S. patent application Ser. No. 14/788,203, filed Jun. 30, 2015, the content of which is hereby incorporated by reference in its entirety.

BACKGROUND

Industrial processes often rely on energy sources such as combustion to generate steam or heat for a feedstock liquid. Some combustion processes involve operation of a furnace or boiler. While combustion provides a relatively low-cost energy source, combustion efficiency is often sought to be maximized within a process, because the resulting flue gases exiting the system may be subject to regulations regarding emissions of harmful gases. Accordingly, one goal of the combustion process management industry is to maximize combustion efficiency of existing furnaces and boilers, which inherently reduces the production of greenhouse gases and other harmful biproducts.

Zirconia-based electrochemical oxygen sensors are widely used in industrial applications for oxygen measurements. This electrochemical oxygen sensor works at elevated temperatures (e.g., 650-800° C.) and measures the oxygen excess remaining after combustion. The response of the sensor to differential oxygen concentrations with fixed partial pressure on the reference electrode, e.g., using air, can be calculated using the Nernst Equation:

$$EMF = \frac{RT}{4F}\ln\frac{P_{process}}{P_{ref}} + C = 0.0496 * T * \log\frac{P_{process}}{P_{ref}} + C$$

Where C is the constant related to the reference/process side temperature variation and thermal junctions in the oxygen probe, R is the universal gas constant, T is the process temperature in degrees Kelvin, and F is the Faraday constant.

SUMMARY

An improved oxygen analyzer includes a controller configured to receive an oxygen sensor signal and provide an oxygen concentration output. A probe is configured to extend into a source of combustion process gas. An oxygen sensor is disposed within the probe and has a sensing electrode mounted to one side of a solid electrolyte and a reference electrode mounted to an opposite side of the solid electrolyte. The oxygen sensor has catalytic beads that are configured to be disposed between the process gas and the sensing electrode. Measurement circuitry is operably coupled to the oxygen sensor and the controller and is configured to provide the controller with the oxygen sensor signal based on an electrical response of the oxygen sensor. The controller is configured to detect a behavior of the oxygen sensor concentration output over time to provide at least one ancillary output.

DETAILED DESCRIPTION OF ILLUSTRATIVE EMBODIMENTS

Figure 1:
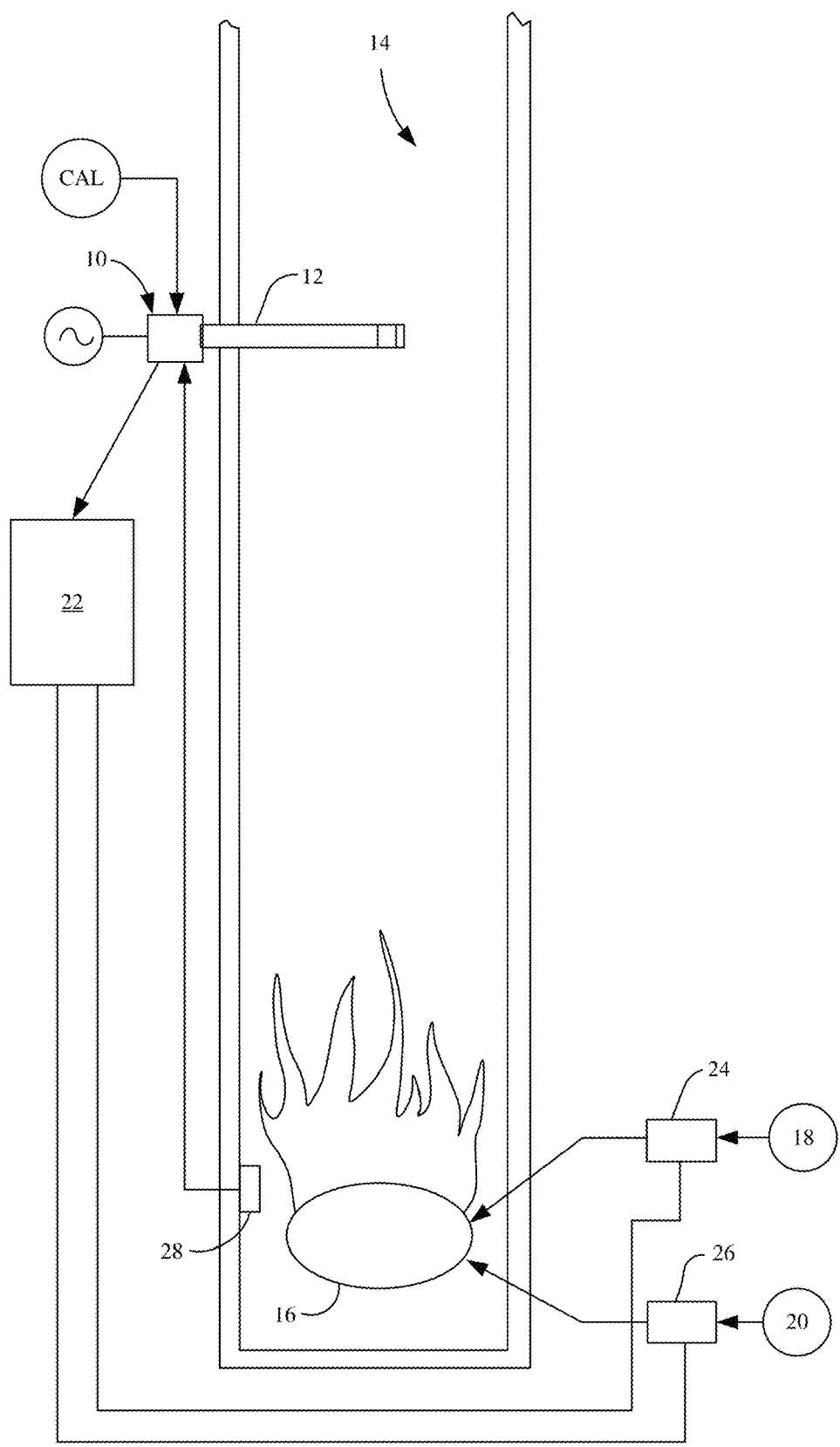
FIG. 1 is a diagrammatic view of an in-situ oxygen analyzer/transmitter with which embodiments of the present invention are particularly applicable.

FIG. 1 is a diagrammatic view of an in-situ oxygen analyzer/transmitter with which embodiments of the present invention are particularly applicable. Transmitter 10 may be, for example, a Model 6888 oxygen transmitter available from Rosemount Inc. (an Emerson Automation Solutions Company). Transmitter 10 includes a probe assembly 12 substantially disposed within a stack or flue 14 of a combustion process. Transmitter 10 is configured to measure oxygen concentration within the flue gas produced by combustion occurring at burner 16. Burner 16 may be operably coupled to a source of air or other oxygen source 18, as well as a combustion fuel source 20. A combustion controller 22 is operably coupled to oxygen valve 24 and fuel valve 20. Based on signals from combustion controller 22, valves 18 and/or 20 control the air and/or fuel supplied to the combustion process occurring at burner 16. Combustion controller 22 receives an indication of oxygen in the flue gas from transmitter 10 and uses this indication to provide efficient and environmentally friendly control of the combustion process. As transmitter 10 is configured to be exposed to the combustion zone, it may be constructed to withstand high temperatures.

Figure 2:
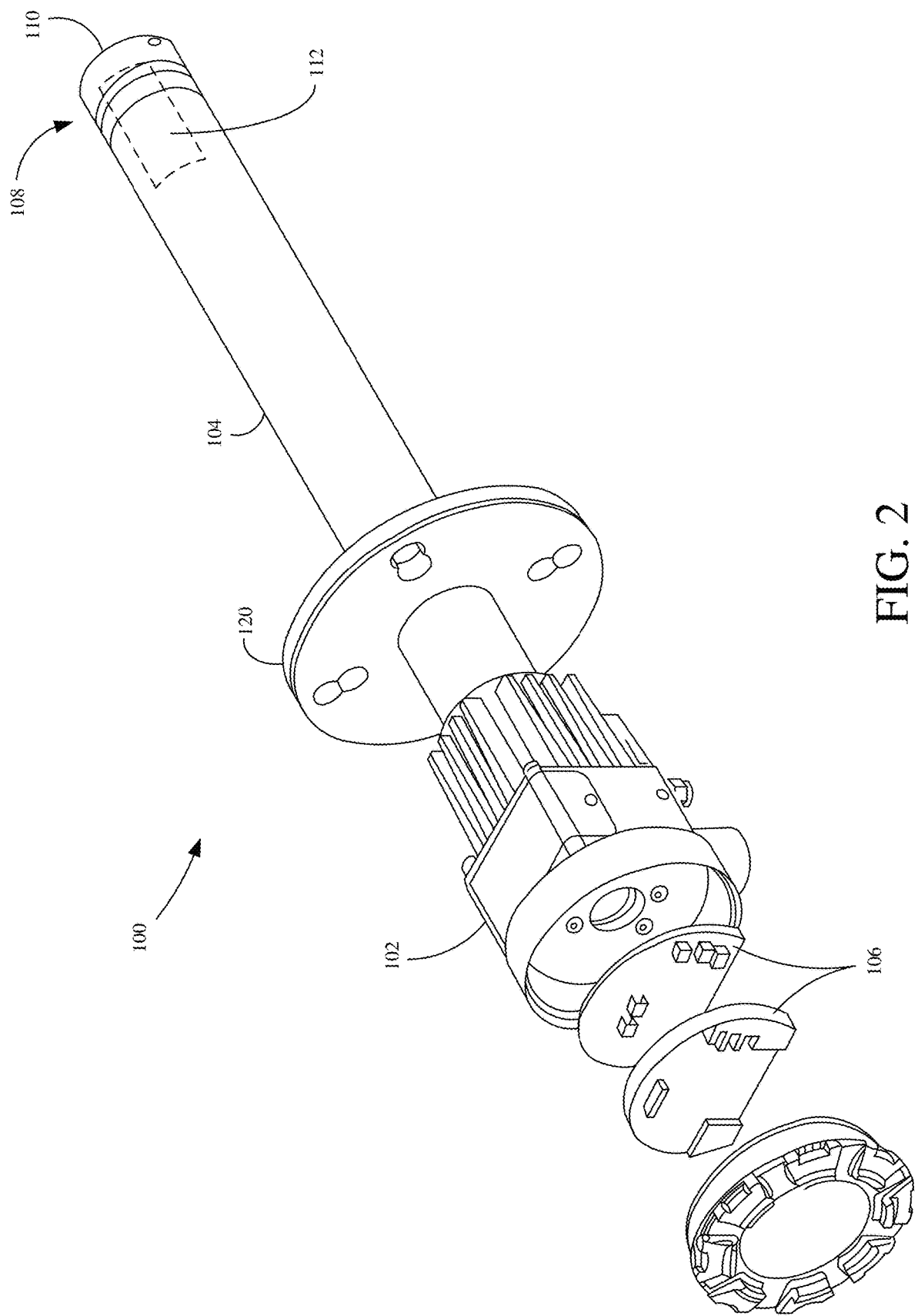
FIG. 2 is a diagrammatic perspective view of a combustion oxygen transmitter with which embodiments of the present invention are particularly applicable.

FIG. 2 is a diagrammatic perspective view of a combustion oxygen transmitter with which embodiments of the present invention are particularly applicable. Transmitter 100 includes housing 102, probe 104, and electronics 106. Transmitter 100 is typically coupled to a stack or flue gas wall using flange 120.

Probe 104 includes a distal end 108 where a diffuser or filter 110 is mounted. Diffuser 110 is a physical device that is configured to allow at least some gaseous diffusion therethrough, but otherwise protects components within probe 104. Specifically, diffuser 110 protects a solid electrolyte-based oxygen measurement cell or sensor 112. Oxygen measurement cell 112 utilizes a zsolid electrolyte such as zirconia or bulk ceramic that provides a potentiometric or amperometric indication of oxygen partial pressure relative to a reference oxygen partial pressure when cell 112 is operating within its thermal operating range. Electronics 106 are typically configured to provide thermal control to probe 104 using an electric heater and temperature sensor (not shown). Additionally, electronics 106 are configured to obtain the amperometric or potentiometric response of cell 112 and calculate an oxygen output. In one example, electronics 106 employs the known Nernst Equation (set forth above) for such calculation.

An in-situ oxygen analyzer, such as transmitter 100, with a potentiometric zirconia sensor 112, is quite robust and can function for years in a combustion environment. In an ideal combustion situation, the oxygen and fuel will combine in an ideal ratio producing primarily carbon dioxide ($CO_2$) and water ($H_2O$) with traces of other gases such as sulfur dioxide ($SO_2$) and nitrogen oxides ($NO_x$) coming from the fuel impurities and nitrogen oxidation. This stoichiometric point with the highest efficiency and lowest emissions would be very difficult to achieve in real combustion due to imperfect fuel/air uniformity as well as fuel energy density and fuel/airflow variation. Typical flue gas oxygen excess concentration is approximately 2-3% for gas burners and between 2-6% for boilers and oil burners. The best operating point is believed to be somewhere between 1%-6% excess oxygen concentration. This optimum operating point is dependent on boiler load and firing rates, which is affected by fuel velocity. Unfortunately, unburned fuel and carbon monoxide produced at a 1000+ part per million (PPM) level is not detected with current oxygen analyzer technology and could potentially create safety concerns and difficulties for combustion control at lower oxygen concentration settings.

A function generator curve is typically developed from test data to assign the ideal oxygen trimming control point based on the firing rate index, fuel or steam flow. The most efficient and safe combustion is generally believed to occur between 0.75% and 2% oxygen excess without a dangerous local reducing condition, which would be difficult using solely oxygen control in combustion. Additionally, any leaks on the boiler or combustor's wall would permit additional oxygen penetration thereby compromising the oxygen concentration and combustion control. While effective combustion control can be accomplished with oxygen measurement alone, combustion efficiency and stability can be improved with concurrent measurement of carbon monoxide (CO). Operation at near trace CO levels of about 100-200 PPM and a slight amount of excess air would indicate that the combustion conditions are near the stoichiometric point with the highest efficiency.

Figure 3:
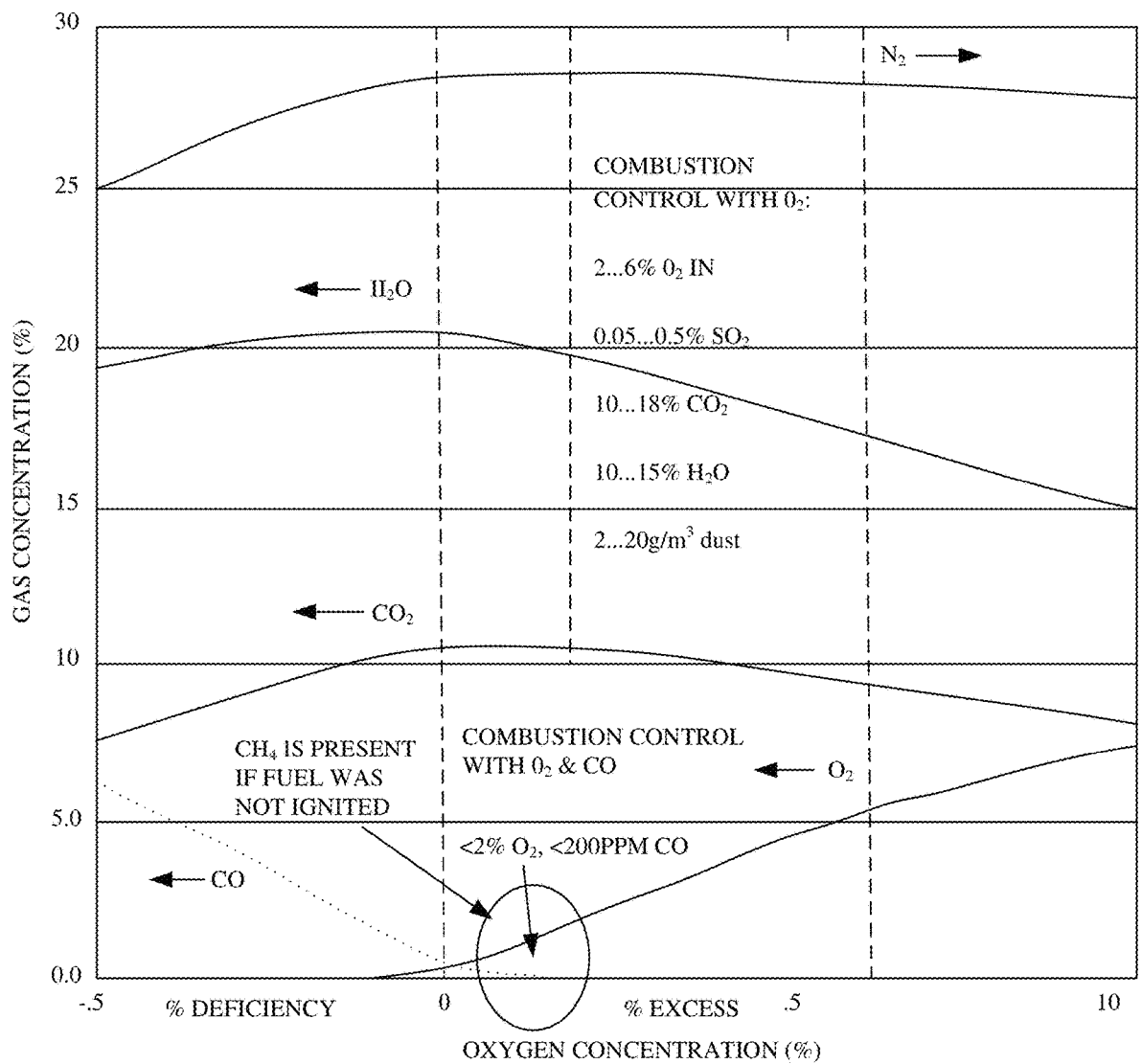
FIG. 3 is a chart indicating gas concentration percentage versus oxygen concentration percentage in order to illustrate the effects of performing combustion control using only oxygen and the effects of performing combustion control using both oxygen and carbon monoxide.

FIG. 3 is a chart indicating gas concentration percentage versus oxygen concentration percentage in order to illustrate the effects of performing combustion control using only oxygen and the effects of performing combustion control using both oxygen and carbon monoxide.

Carbon monoxide sensors and sensing devices are commercially available for applications ranging from workplace safety to exhaust gas analysis. Unfortunately, none of them provide a reliable in-situ carbon monoxide measurement for the combustion process. Additionally, studies have been done on chemical gas sensors based on semiconducting oxides for combustible gas detection. This type of sensor is known as the Taguchi sensor and employs a solid-state device made of sintered n-type metallic oxide (iron, zinc, and tin families) but has relatively poor selectivity and insufficient long-term stability for use in a combustion system. Additionally, infrared (IR) absorption techniques relying on the measurement of infrared light absorption could be used but would require a flue gas conditioning system that would be relatively complex and expensive. Another type of sensor that could potentially provide carbon monoxide information is known as a tunable diode laser spectroscopy sensor in which a laser light is passed through the sensor. However, such a sensor would require a relatively powerful laser and such a sensor would still be susceptible to fouling at heavy particulate loads, wide background radiation from the fireball, and the required temperature and pressure compensations as well as very high expense. Invented in the 1970s, solid-state electrochemical mixed-potential zirconia technology was shown not to be very reliable in the challenging and severe combustion environment. The only in-situ carbon monoxide probe available on the market is currently based on mixed-potential zirconia technology and was developed for very clean gas combustion applications.

In accordance with embodiments described herein, a combustion oxygen analyzer is provided with the ability to monitor the signal from a zirconia-based oxygen sensor over time to provide additional outputs relative to one or more non-oxygen gases. Examples of these non-oxygen gases include carbon monoxide, and combustibles. Embodiments described herein generally have a normal operating mode in which an oxygen analyzer obtains a signal from a zirconia-based oxygen sensor and provides an indication of remaining oxygen in the combustion process very precisely using the sensor output, which depends logarithmically on the oxygen concentration according to the Nernst equation, set forth above.

Figure 4:
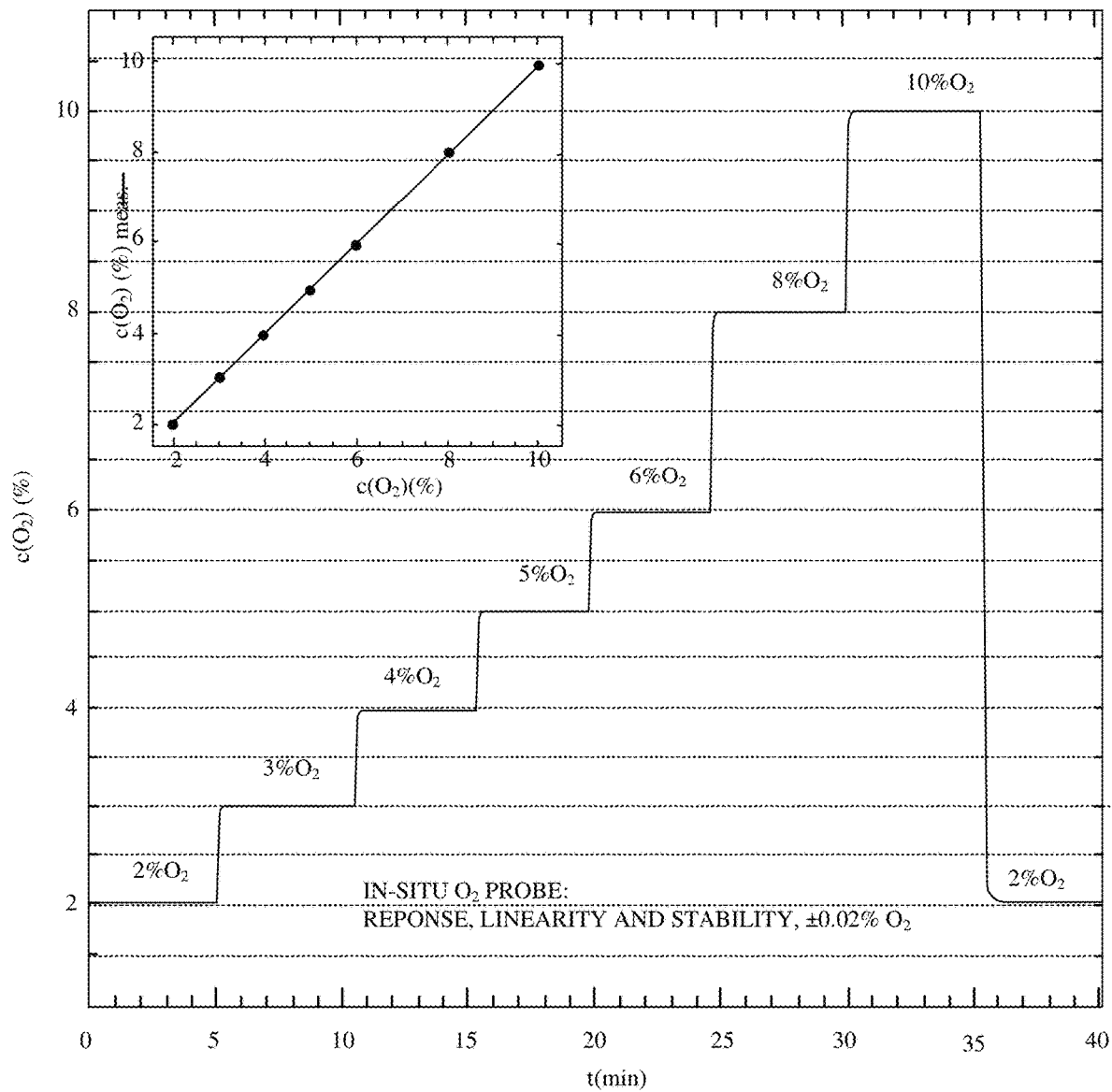
FIG. 4 is a chart illustrating oxygen analyzer response for various oxygen concentrations, ranging from 2% to 10%.

FIG. 4 is a chart illustrating oxygen analyzer response for various oxygen concentrations, ranging from 2% to 10%. A limitation of oxygen measurement using zirconia technology is its inability to measure correct oxygen levels in the presence of high concentrations of combustibles gases. When these gases are present, it indicates an irregular and dangerous combustion. Zirconia sensors read low in the presence of combustibles due to oxygen consumption in the combustion reaction on the process electrode. FIG. 4 illustrates the normal operating mode of the oxygen analyzer and provides a very precise signal indicative of oxygen concentration as the oxygen varies from 2% (lower left) to 10% (upper right).

In accordance with an embodiment of the present invention, the oxygen analyzer has a second mode in which the behavior of the oxygen sensor over time is analyzed in order to detect and/or quantify one or more non-oxygen gasses in the flue.

Figure 5:
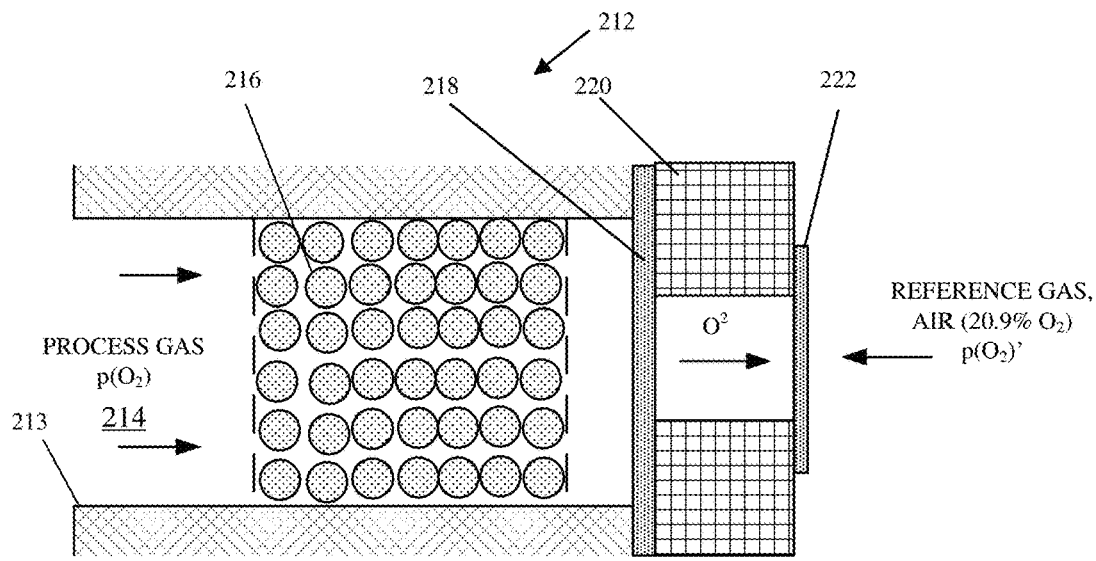
FIG. 5 is a diagrammatic cross-sectional side elevation view of a zirconia-based oxygen sensor in accordance with an embodiment of the present invention.

FIG. 5 is a diagrammatic cross-sectional side elevation view of a zirconia-based oxygen sensor in accordance with an embodiment of the present invention. As shown in FIG. 5, oxygen sensor 212 includes a process gas inlet 213 that is open or exposed to process gas having an oxygen concentration p(O$_2$), illustrated diagrammatically at reference numeral 214, which diffuses or otherwise passes through catalytic beads 216 in order to access a cermet sensing electrode 218, which is preferably formed at least partially of platinum. A layer of zirconia 220 allows oxygen ion movement from cermet sensing electrode 218 to reference electrode 222, which is configured to be in contact with a reference gas, such as air (20.9% O$_2$) having an oxygen concentration p(O$_2$)'. Reference electrode 222 is also preferably formed at least partially of platinum. This oxygen sensor 212 is configured to be disposed in the distal end 108 of the in-situ oxygen sensing probe 104 and thus process gas 214 is or includes flue gas from the combustion. Catalytic beads 216 function to protect cermet sensing electrode 218 in a reducing atmosphere and high sulfur environment. Catalytic beads may be formed, at least partially of platinum deposited or otherwise affixed to a ceramic substrate. When zirconia 220 is at its operating temperature, the difference in oxygen partial pressure between the process gas side p(O$_2$) and the reference gas side p(O$_2$)' will generate a potentiometric response between cermet electrodes 218 and 220.

During regular, well-controlled combustion, the combustibles concentration is very low (not exceeding 200 ppm) or 0.02%. In this condition, oxygen regulation is relatively smooth without any sharp abnormal oxygen concentration drops (less than 0.2%/minute). When irregular control or combustion instability occurs, it would lead to carbon monoxide formation in the process thus indicating incomplete combustion, especially when carbon-based fuel is mixed with an insufficient amount of oxygen to complete the reaction:

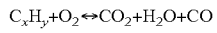

$$C_xH_y+O_2 \leftrightarrow CO_2+H_2O+CO$$

An oxygen sensor with a catalytic electrode film and beads will convert carbon monoxide formed in the combustion process, and remaining fuel, thereby consuming oxygen reaching sensing electrode 218 in the following equations:

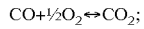

$$CO+\tfrac{1}{2}O_2 \leftrightarrow CO_2;$$

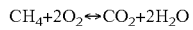

$$CH_4+2O_2 \leftrightarrow CO_2+2H_2O$$

Unlike regular combustion with oxygen concentration trimmed down to the control point very smoothly, these two reactions will abruptly reduce (in approximately 5 seconds) the analyzer's oxygen concentration reading. According to these reactions, ideally oxygen concentration will drop by half the carbon monoxide concentration or approximately twice the methane concentration leading to four times more oxygen consumption related to methane.

In accordance with embodiments of the present invention, this oxygen concentration drop in the cermet electrode and catalytic beads during the combustion reaction is used for precise and reliable carbon monoxide and unburned fuel (CH$_4$) detection. Embodiments described herein will help to set the oxygen concentration control for more efficient and safe trimming of oxygen concentration in combustion. With carbon monoxide as the first product of incomplete combustion to appear, the analyzer's abrupt O$_2$ reading drop is a leading indication of carbon monoxide presence within milliseconds of breakthrough occurrence in combustion.

Figure 6:
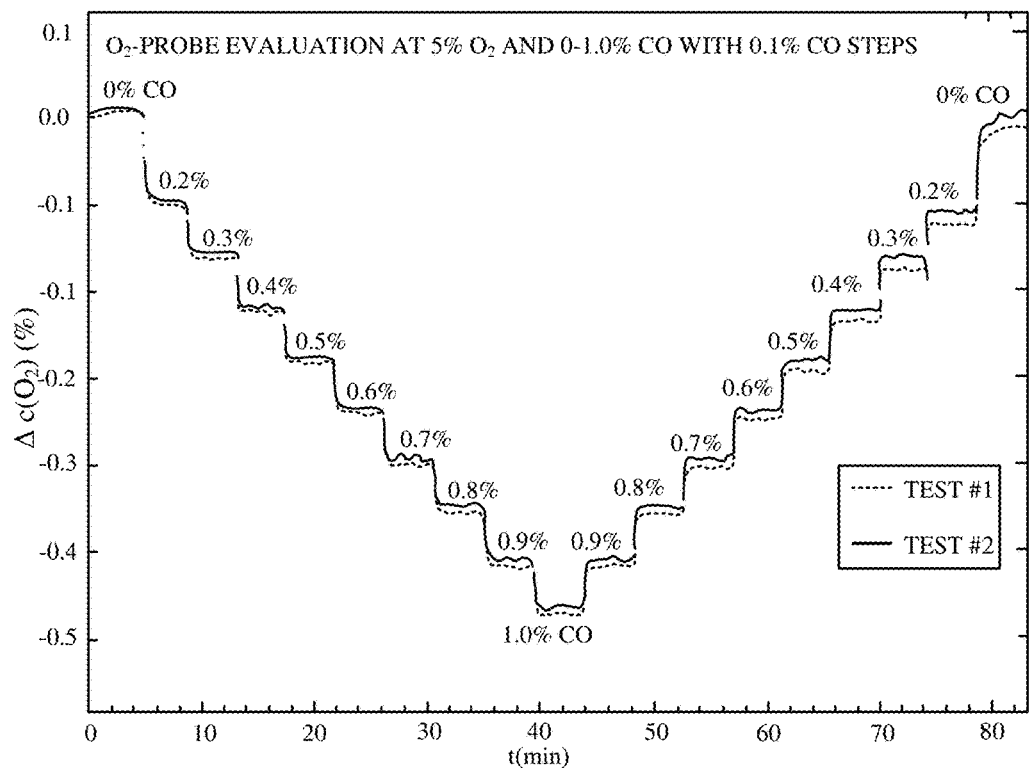
FIG. 6 is a chart illustrating oxygen analyzer step response to carbon monoxide at 5% oxygen for various levels (ranging from 0% to 1.0%).
Figure 7:
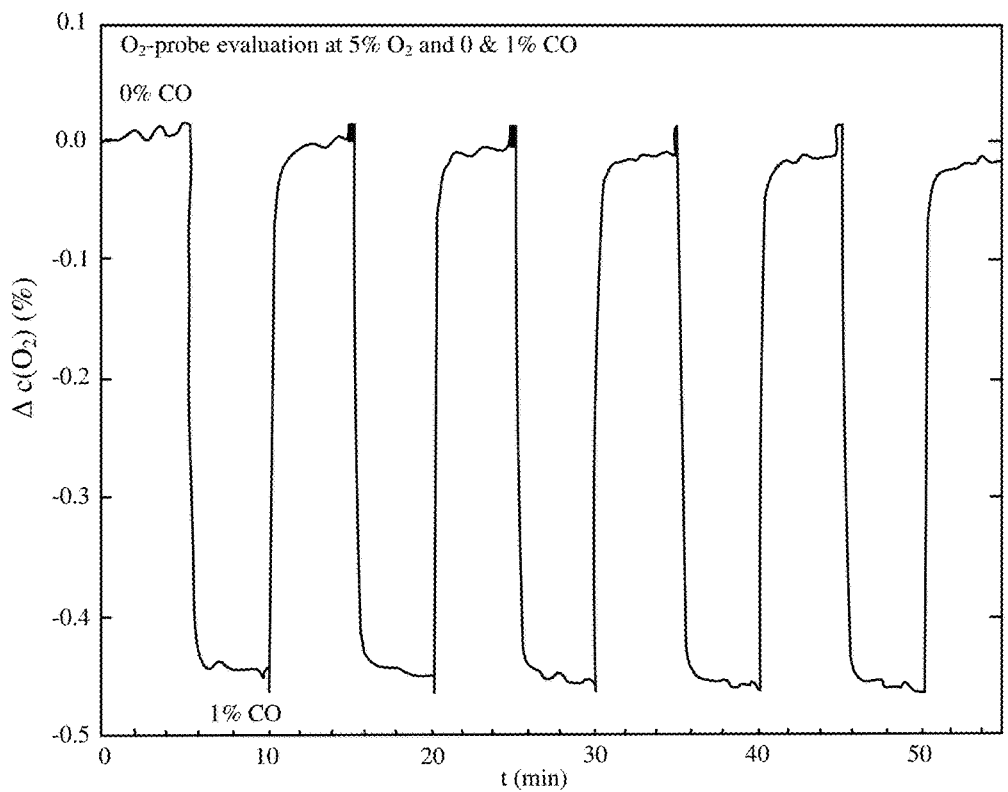
FIG. 7 is a chart illustrating oxygen analyzer reading change in the presence of 1% carbon monoxide.

FIG. 6 is a chart illustrating oxygen analyzer step response to carbon monoxide at 5% oxygen for various levels (ranging from 0% to 1.0%). FIG. 7 is a chart illustrating oxygen analyzer reading change in the presence of 1% carbon monoxide. As can be seen from FIGS. 6 and 7, the oxygen sensor response to carbon monoxide is highly reproduceable up to 1% carbon monoxide, linearly depending on carbon monoxide concentration.

Figure 8:
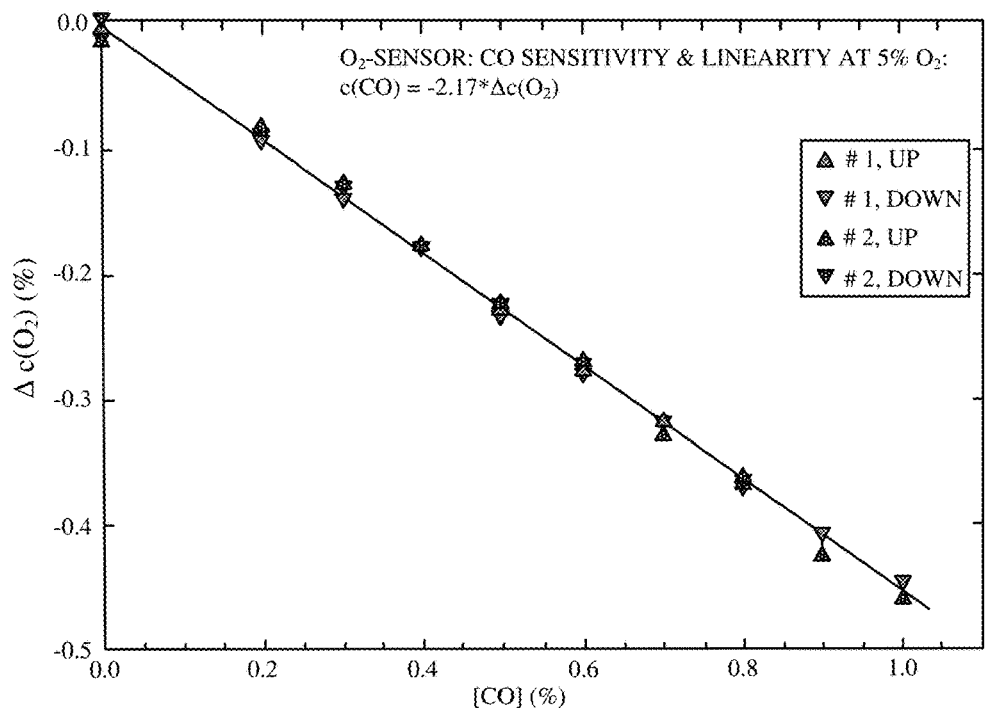
FIG. 8 is a chart of oxygen analyzer reading change linear dependence on carbon monoxide concentration.

FIG. 8 is a chart of oxygen analyzer reading change linear dependence on carbon monoxide concentration. As shown in FIG. 8, when CO concentration is in the 0.0-1.0% range, the CO concentration can be computed as a function of the change in oxygen concentration value. In the example shown in FIG. 8, the CO concentration is equal to −2.17 times the change in oxygen concentration.

Figure 9:
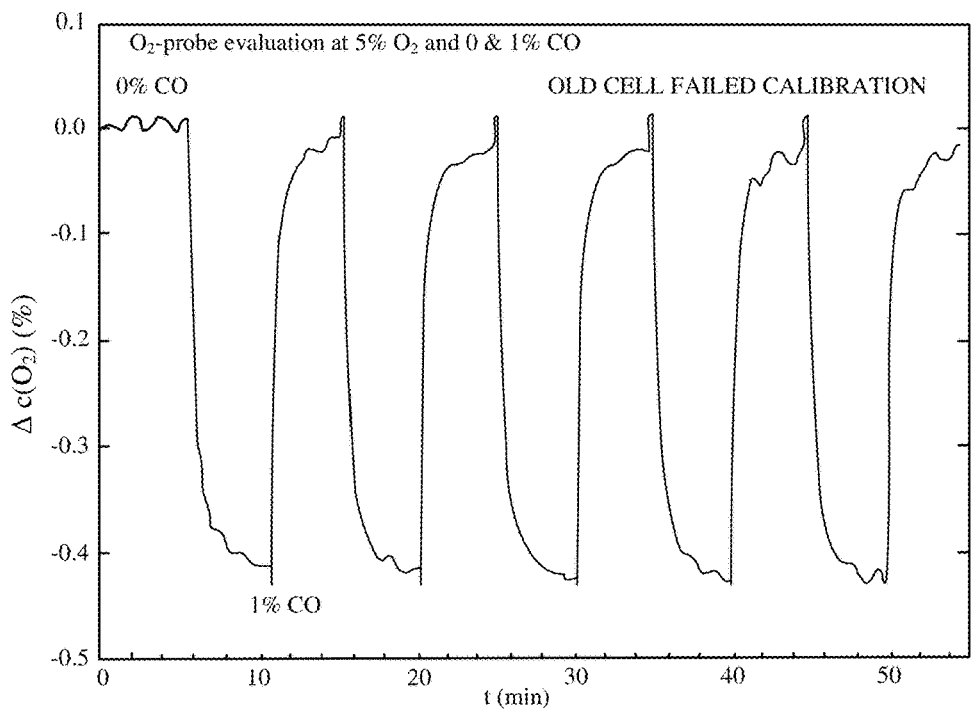
FIG. 9 is a chart showing oxygen analyzer response between 0% and 1% carbon monoxide in a 5% oxygen environment for an oxygen sensor utilizing an old or depleted oxygen sensor.

FIG. 9 is a chart showing oxygen analyzer response between 0% and 1% carbon monoxide in a 5% oxygen environment for an oxygen sensor utilizing an old or depleted oxygen sensor. Using an oxygen analyzer in accordance with embodiments described herein even with an old or worn oxygen sensor (i.e., one that fails oxygen calibration and does not have very reliable oxygen measurements) still reproducibly detects carbon monoxide. This is at least partly due to the catalytic beads 216 in the oxygen sensor.

Figure 10:
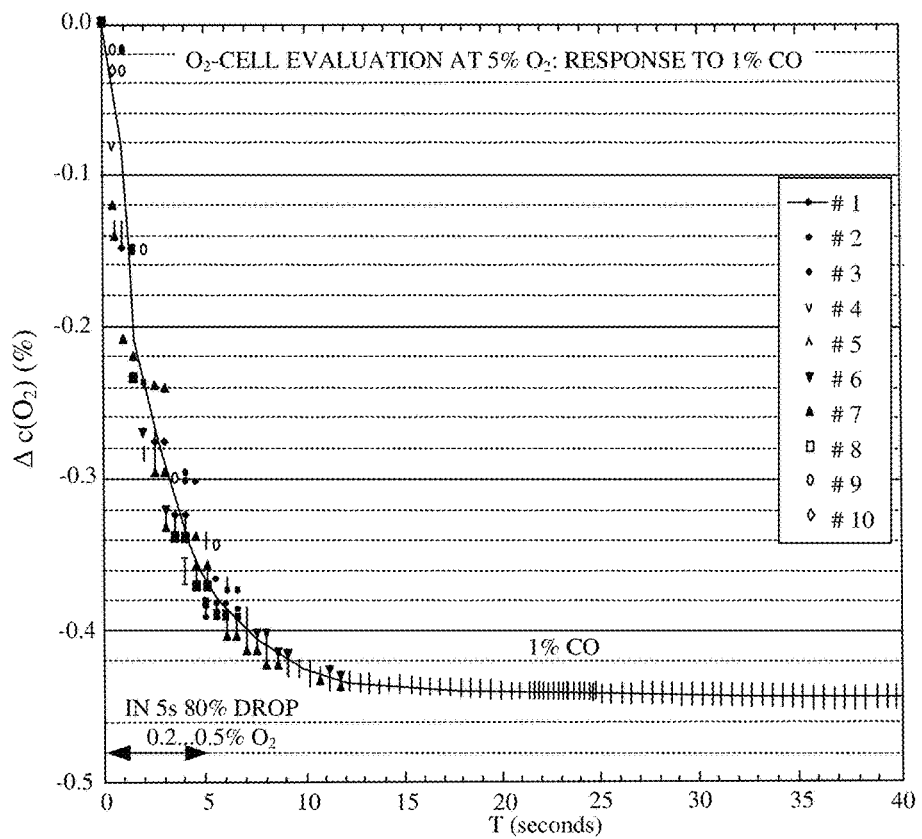
FIG. 10 is a chart showing oxygen analyzer response to 1% carbon monoxide.

FIG. 10 is a chart showing oxygen analyzer response to 1% carbon monoxide. As can be seen, the oxygen analyzer response to carbon monoxide is very fast (on the order of approximately 10 seconds for a 90% response). Considering that oxygen trimming is very smooth and results in oxygen rates of change are greater than ten times this value, this response to carbon monoxide is deemed reliable. Higher oxygen or lower carbon monoxide or methane concentrations would contribute to slightly more efficient CO/CH$_4$ combustion but even at low (approximately 1.5% oxygen concentration) the conversion is exceeding 90%.

Figure 11:
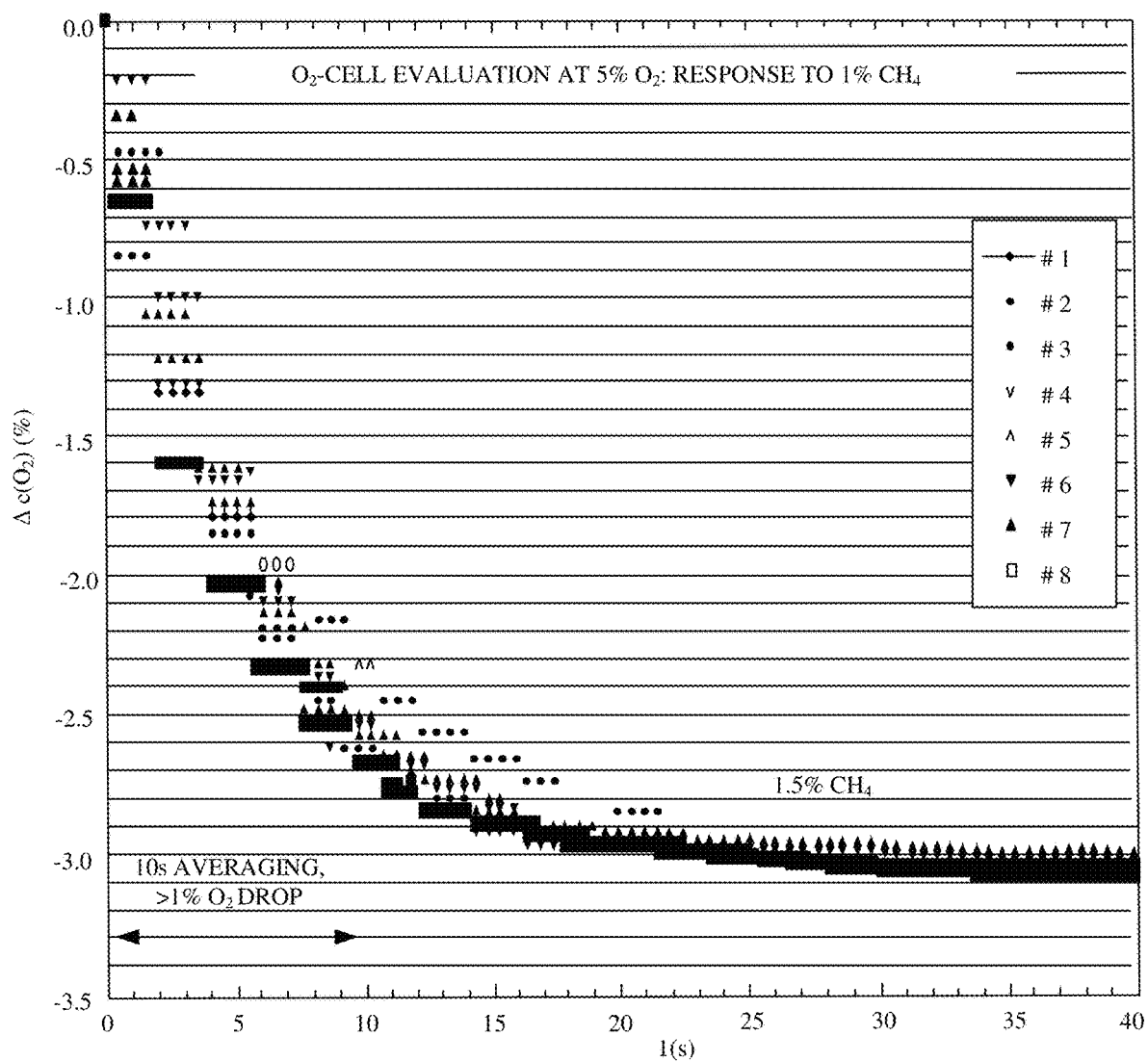
FIG. 11 is a chart showing oxygen analyzer response to methane.

FIG. 11 is a chart showing oxygen analyzer response to methane. Similar to carbon monoxide detection, an oxygen analyzer in accordance with embodiments described herein can detect unburned fuel, such as methane (CH$_4$), based on an abrupt (approximately 10 second) oxygen reading drop. Methane and carbon monoxide conversion on the oxygen sensor cermet sensing electrode 218 and catalytic beads 216 is close to 100% with a very sharp (0.1-0.4% O$_2$ drop related to carbon monoxide—see FIG. 10) and greater than 1% oxygen drop related to methane, as shown in FIG. 11.

Figure 12:
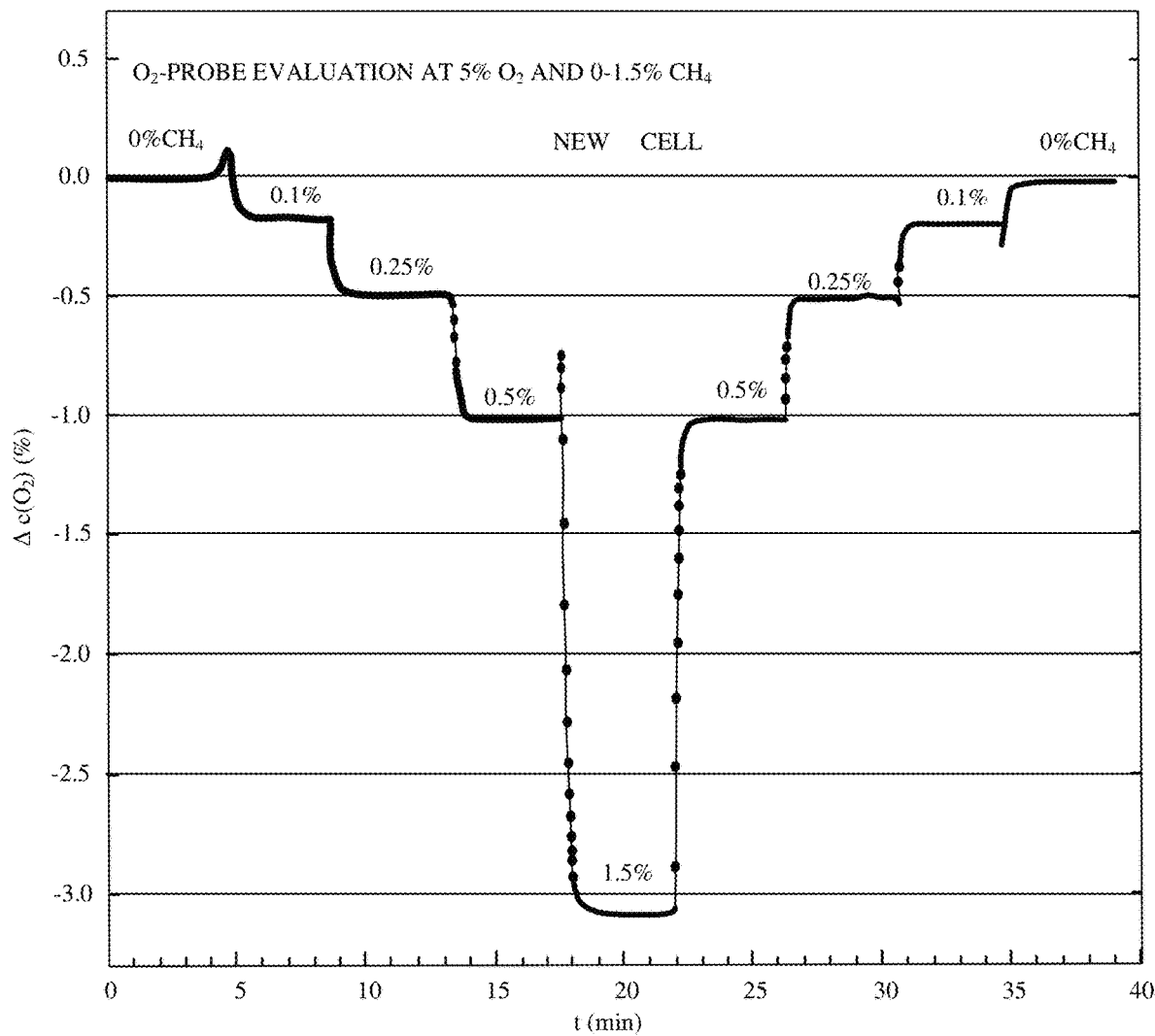
FIG. 12 is a chart showing oxygen analyzer reading change in the presence of 0.1-1.5% $CH_4$.
Figure 13:
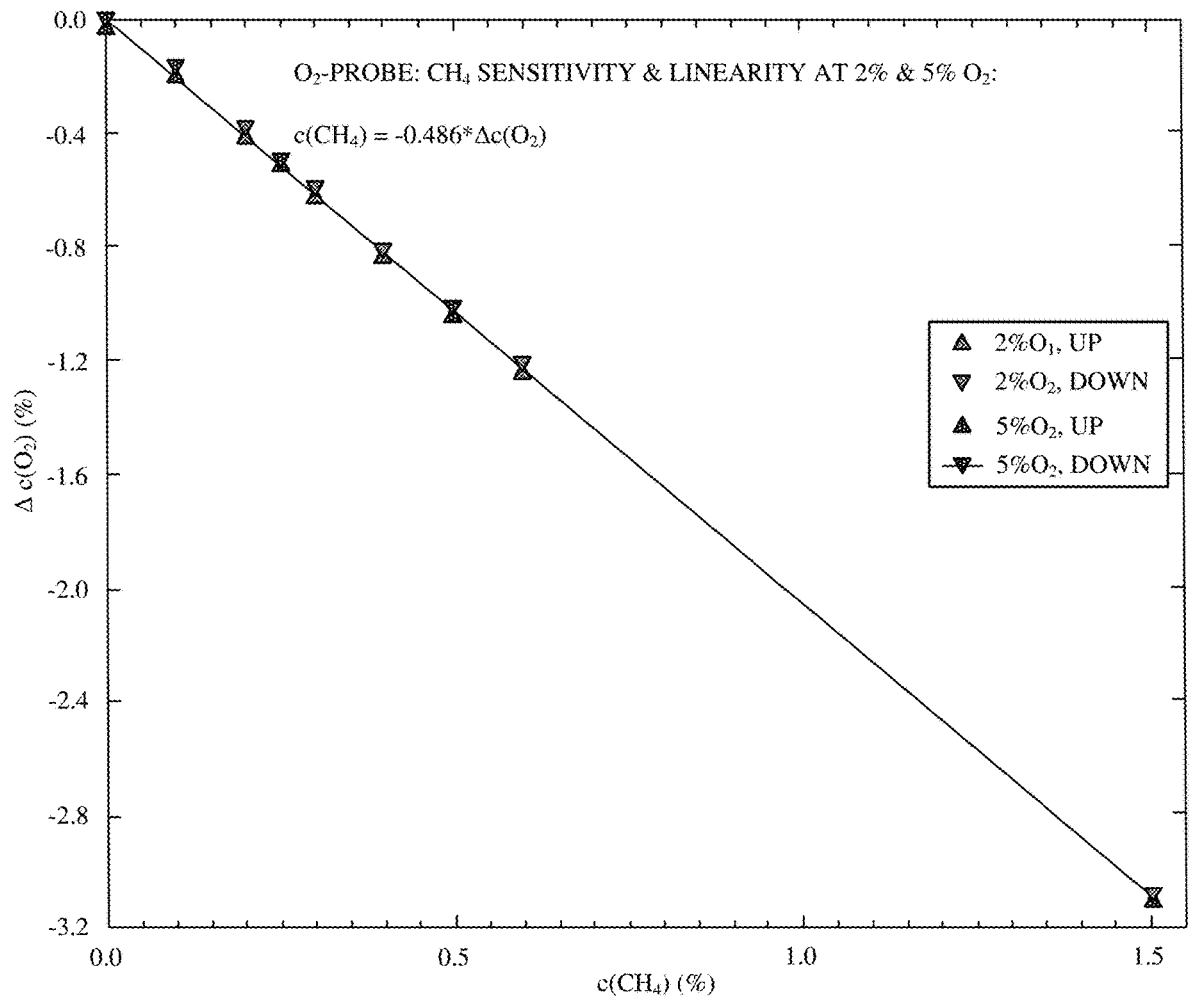
FIG. 13 is a chart showing oxygen analyzer reading drop line dependence on methane concentration.

FIG. 12 is a chart showing oxygen analyzer reading change in the presence of 0.1-1.5% CH$_4$. FIG. 13 is a chart showing oxygen analyzer reading drop line dependence on methane concentration. As shown in FIG. 13 when methane concentration is in the 0.0-1.5% range, the methane concentration can be computed as a function of the change in oxygen concentration value. In the example shown in FIG. 13, the methane concentration is equal to −0.486 times the change in oxygen concentration.

Figure 14:
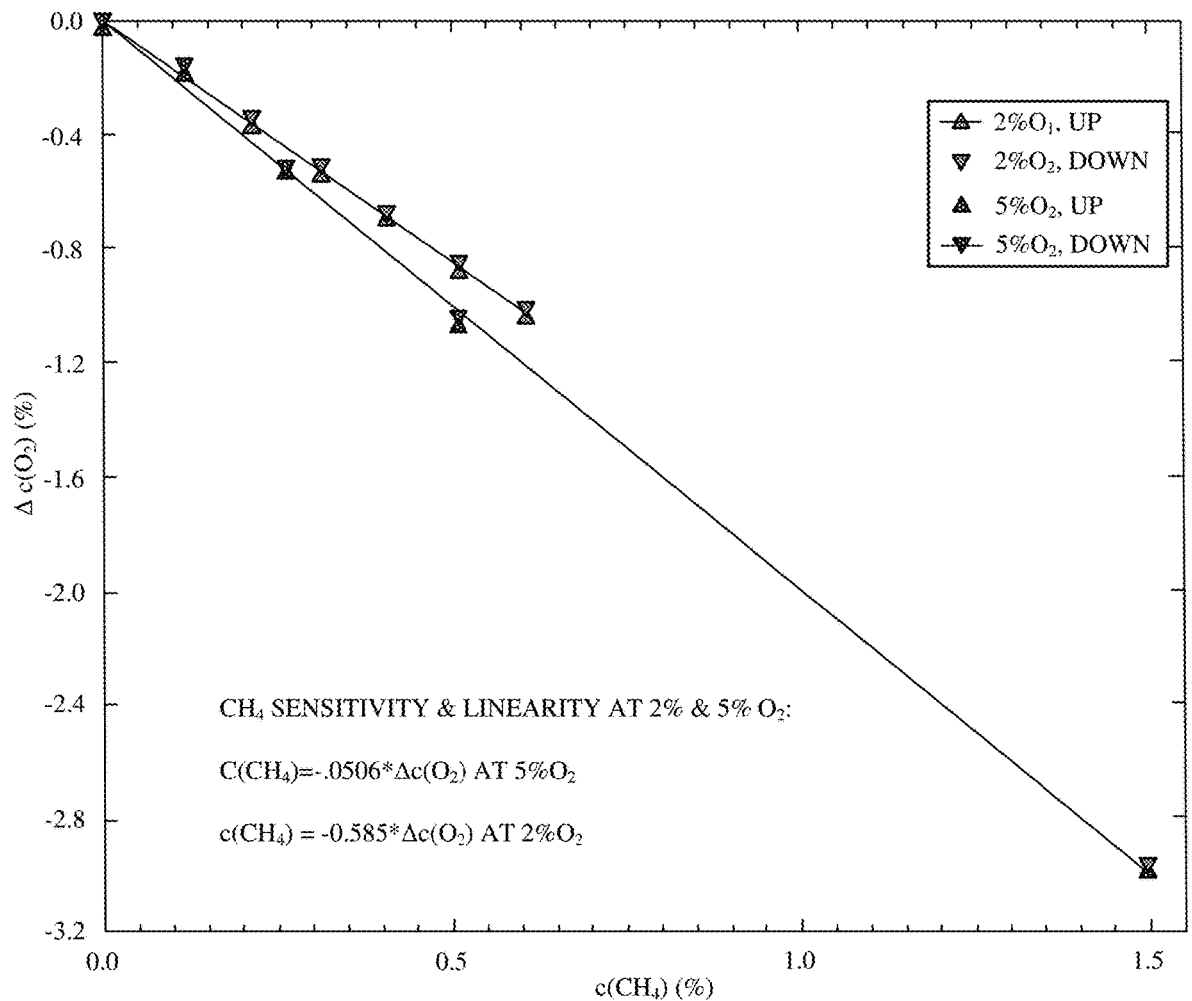
FIG. 14 is a chart showing oxygen analyzer reading drop line dependence on methane concentration for an old or depleted oxygen sensor cell.

FIG. 14 is a chart showing oxygen analyzer reading drop line dependence on methane concentration for an old or depleted oxygen sensor cell. The oxygen analyzer sensitivity to methane is very good, and linearly depends on methane concentration as shown in FIGS. 12-14 and permits calibration-free methane detection even using an aged oxygen sensor. Additionally, as shown in FIG. 14, the relationship between oxygen concentration change vs methane concentration can be affected by variations in oxygen concentration (FIG. 14 shows 2% vs 5%). Thus, when providing a methane concentration as a function of oxygen concentration change, it is useful to adjust the relationship based on the most recently measured oxygen concentration. In the example shown in FIG. 14, when the oxygen concentration is at 5%, the methane concentration is −0.506 times the change in oxygen concentration. However, when the oxygen concentration is 2%, the methane concentration is −0.585 times the change in oxygen concentration.

Considering the much larger oxygen consumption in a combustion reaction with methane, an oxygen analyzer in accordance with embodiments described herein will provide a reliable indication of carbon monoxide breakthrough with oxygen level drops up to 0.5% and unburned fuel detection with oxygen concentration drops greater than 0.5%. This new advanced oxygen analyzer feature will provide effective oxygen trimming option for efficient, reliable and safe combustion control.

Figure 15:
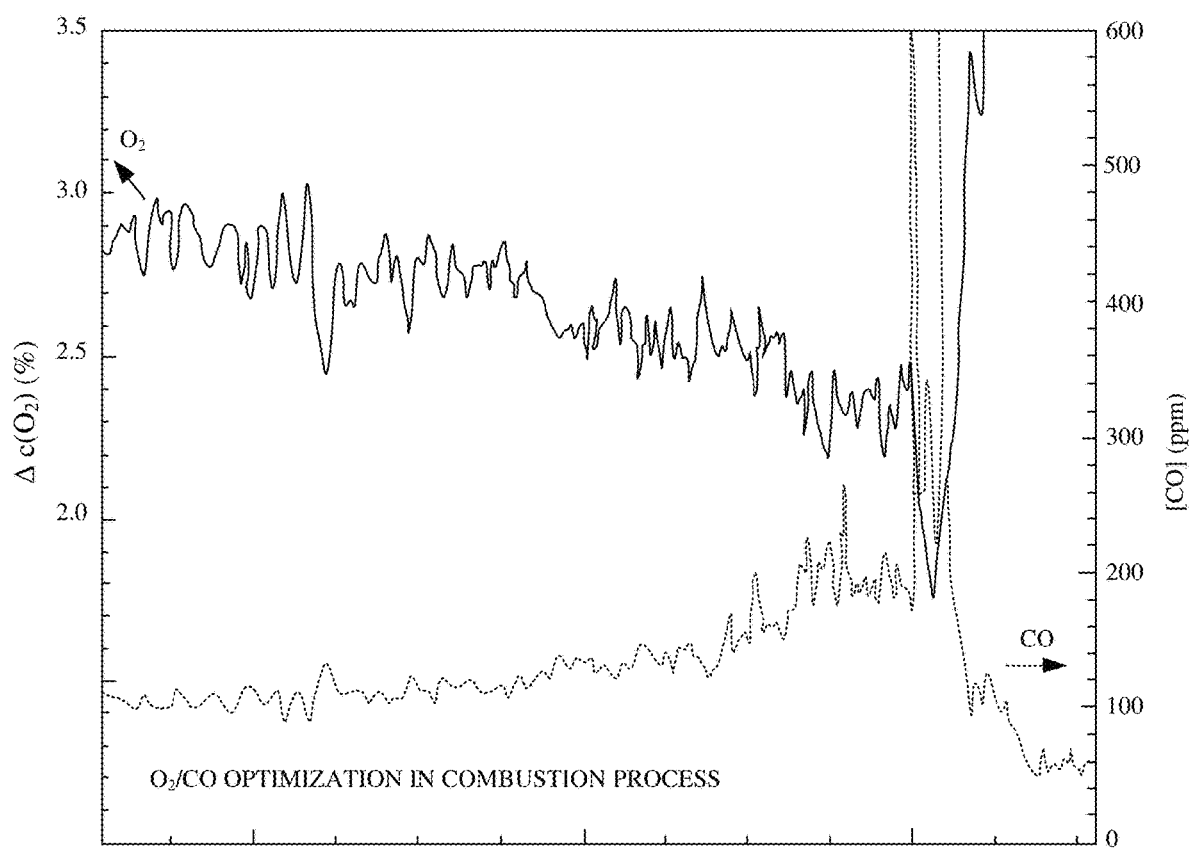
FIG. 15 is a chart illustrating oxygen analyzer cross-sensitivity to carbon monoxide in the process.

FIG. 15 is a chart illustrating oxygen concentration percentage, carbon monoxide concentration, and oxygen/carbon monoxide optimization in a combustion process. This permits effective diagnostics for combustion process problems such as faulty burners, induced draft fans, and/or fuel/air mixture imbalances. As the oxygen analyzer in accordance with embodiments described herein monitors the oxygen concentration, the rate of change in the oxygen concentration reading is monitored by the electronics and/or software. If a drop in measured oxygen concentration is in the range of 0.2-0.4% over a time span of approximately 5-10 seconds, this will indicate the presence of carbon monoxide and a carbon monoxide algorithm may be applied to the oxygen sensor reading to calculate the carbon monoxide concentration based on that drop. Additionally, or alternatively, an alert can be provided that can be configured to indicate "high carbon monoxide". If the magnitude of the change in oxygen concentration readings is greater than 0.5% in the same time span, the oxygen analyzer will indicate that methane, or an equivalent combustible is present in the flue gas and a different calculation will be used to calculate the methane concentration and/or set a "high $CH_4$ alert".

Figure 16:
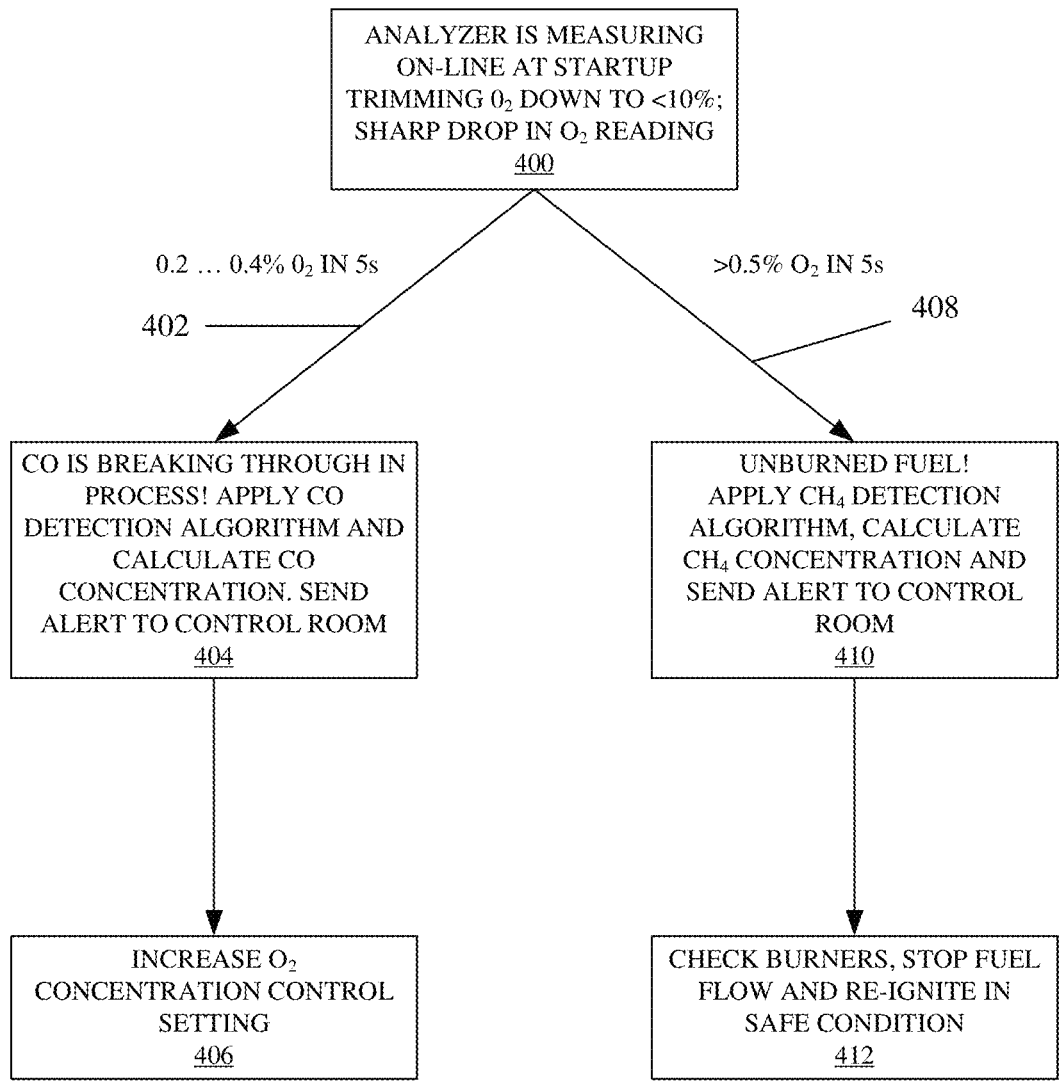
FIG. 16 is a block diagram illustrating a method of providing combustion control using an advanced in-situ oxygen analyzer in accordance with an embodiment of the present invention.

FIG. 16 is a diagrammatic view of in-situ oxygen analyzer operation in accordance with an embodiment of the present invention. At block 400, the analyzer measures an on-line oxygen measurement, at startup, trimming the oxygen concentration down to less than 10%. Subsequently, during normal oxygen measurement operation, the oxygen analyzer detects a relatively sharp drop in the oxygen sensor reading over a 5 second period. As shown in FIG. 16, if the drop in the reading is between 0.2% and 0.4% oxygen concentration, control passes along line 402 to block 404 where an indication is provided that carbon monoxide is breaking through in the process. Additionally, at block 404, the analyzer can apply a carbon monoxide detection algorithm, and calculate the specific carbon monoxide concentration based on the signal from the zirconia-based oxygen sensor. The controller may send an alert, via any suitable wired or wireless communication, to a control room controlling the combustion process such that remedial action can be taken. In one example, the control room may responsively increase oxygen to the combustion system, as indicated at block 406 in order to address the carbon monoxide breakthrough.

As also shown in FIG. 16, if the drop in oxygen sensor readings over a 5 second period is greater than 0.5% oxygen concentration, control passes along line 408 to block 410, where an indication of unburned fuel detection is provided. Additionally, at block 410, the analyzer may apply a methane (or combustibles) detection algorithm to actually calculate the methane concentration. Further, an alert may be sent to the control room indicating the presence and/or concentration of methane or combustibles in the flue gas. Remedial action can then be taken, as indicated at block 412, where burners of the combustor may be checked, the fuel flow may be stopped, and the system may be reignited in a safe condition.

Figure 17:
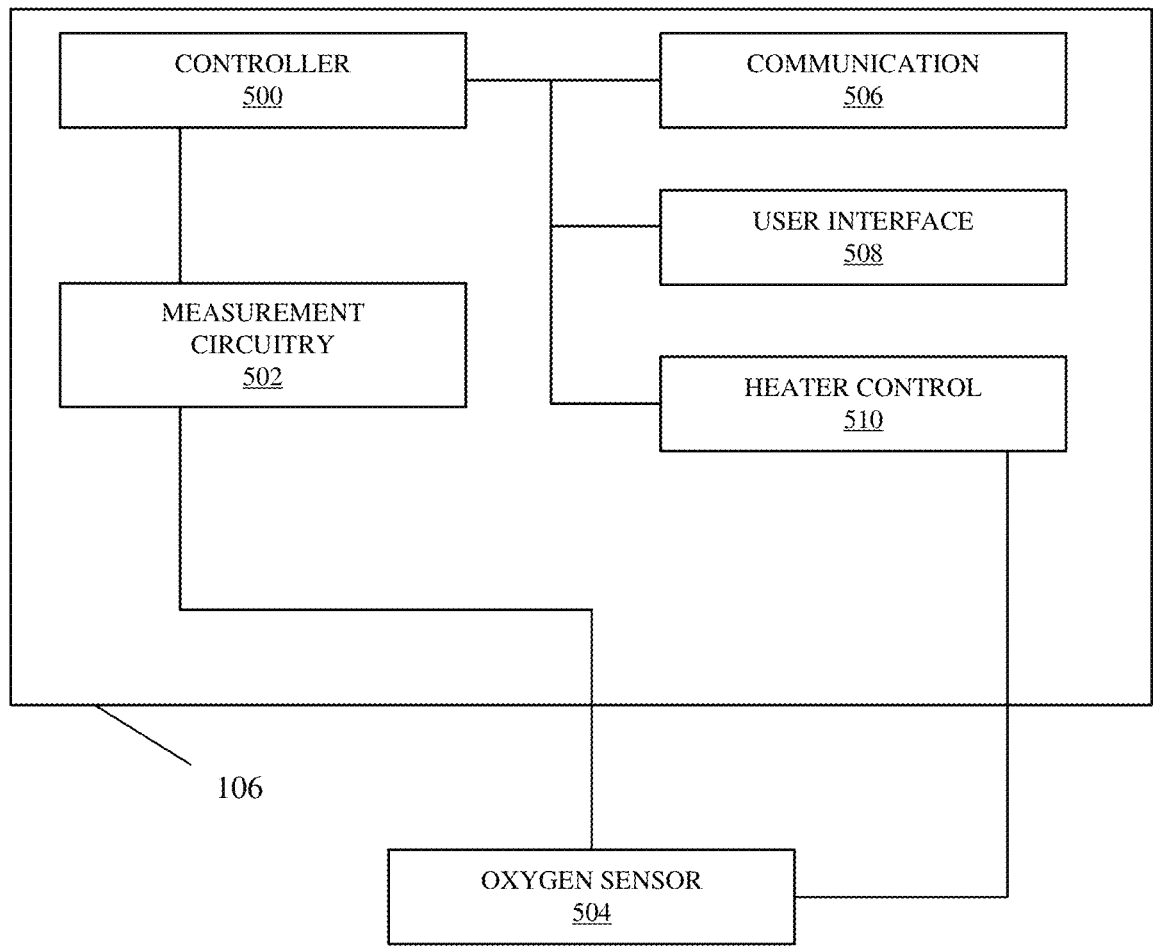
FIG. 17 is a system block diagram of electronics of an improved oxygen analyzer in accordance with an embodiment of the present invention.

FIG. 17 is a system block diagram of electronics 106 within an improved oxygen analyzer in accordance with an embodiment of the present invention. Electronics 106 includes controller 500, which, in some embodiments, may be a microprocessor. Controller 500 is coupled to measurement circuitry 502, which may include suitable amplification, linearization, and analog-to-digital conversion circuitry to obtain a potentiometric response from oxygen sensor 504 coupled to measurement circuitry 502. Measurement circuitry 502 provides a digital indication of the potentiometric response of oxygen sensor 504 to controller 500. Controller 500 is able to calculate an oxygen concentration output using the well-known Nernst Equation set forth above. Additionally, controller 500 is able to evaluate a time-based response of the potentiometric signal of oxygen sensor 504 in order to provide carbon monoxide breakthrough and/or combustibles indication as set forth above. In one embodiment, controller 500 may store or otherwise detect a difference in the potentiometric response of oxygen sensor 504 over a defined time period, such as 5 seconds or 10 second. This difference in response over the defined time period can then be compared into one or more selected thresholds in order to provide the ancillary (i.e. non-oxygen related) outputs described above.

In one example, controller 500 may be a microprocessor programmed to execute a series of instructions that simply obtains a potentiometric response at a first time, and a second potentiometric response at a pre-selected duration later than the first time (such as 5 seconds). These two potentiometric responses may then be compared to determine if a difference exceeds one or more of the selected thresholds. Certainly, other techniques for evaluating the time-based response of the potentiometric signal of the oxygen sensor can be employed.

Controller 500 is also coupled to communication circuitry 506 in order to provide the oxygen analyzer with the ability to communicate over a suitable process communication segment or loop. Process communication may be via a wired connection or a wireless connection. Process communication is a type of communication that is specifically adapted for real-time process control. Examples of process communication include, without limitation, communication in accordance with the Highway Addressable Remote Transducer (HART®) protocol or the FOUNDATION™ Fieldbus protocol. However, other suitable process communication protocols, wired and/or wireless can be used in accordance with embodiments of the present invention. Moreover, embodiments described herein may also include transmitting information in accordance with a wireless process communication protocol, such as IEC62591.

Additionally, controller 500 is coupled to user interface 508 which may be provided in the form of an oxygen concentration read out on the housing of the transmitter, as well as any suitable operator input devices, such as buttons, knobs, dials, et cetera. Further, in some embodiments, electronics 106 may include heater control circuitry 510 coupled to controller 500 in order to energize a heater within the probe to maintain the oxygen sensor at an effective thermal operating range, such as 650-800° Celsius.

Figure 18:
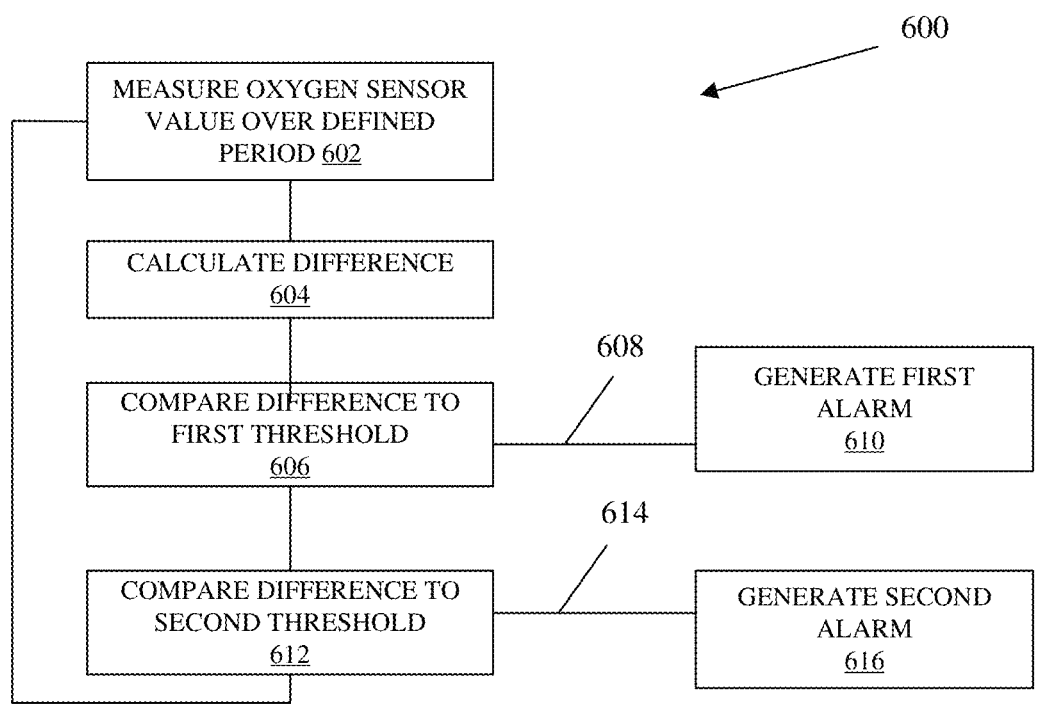
FIG. 18 is a flow diagram of a method of operating a zirconia-based oxygen combustion analyzer in accordance with an embodiment of the present invention.

FIG. 18 is a flow diagram of a method of operating a zirconia-based oxygen combustion analyzer in accordance with an embodiment of the present invention. Method 600 begins at block 602 where the combustion analyzer measures an oxygen sensor value over a defined period, such as 5 seconds. Next, at block 604, the combustion analyzer calculates the difference in oxygen sensor value over the defined period. Next, at block 606, the calculated difference is compared to a first threshold such as determining whether the difference is greater than 0.5% of oxygen concentration. If this occurs, control passes along line 608 to block 610 where the combustion analyzer begins generating a combustible or unburned fuel (methane) alarm and causes controller 500 to use a combustibles algorithm to calculate the concentration of the combustibles (e.g., methane) in the process gas based on the oxygen sensor potentiometric response. As set forth above, this will allow those in charge of the combustion control to check burners, stop fuel flow, and reignite in a safe condition.

As shown in FIG. 18, method 600 also includes comparing the calculated difference to a second threshold or band, as indicated at block 612. For example, the second threshold or band can be a difference in oxygen concentration value between 0.2% and 0.4%. If the difference is within this band, control passes along line 614 to block 616 where a second alarm, such as a carbon monoxide breakthrough alarm is provided. Additionally, controller 500 can switch to begin using a different calculation than the Nernst Equation, which technique utilizes the potentiometric response of the oxygen sensor to provide a carbon monoxide concentration indication.

As described above, a zirconia-based oxygen analyzer design is provided which is able to provide reliable oxygen concentration measurements, as well as advanced unburned fuel detection and carbon monoxide detection in combustion flue gas. The zirconia oxygen sensor used in these embodiments generally employs catalytically active cermet electrodes and protective catalytic beads in the zirconia oxygen sensor package, which beads convert combustibles (e.g., $CH_4$) and CO, abruptly reducing in approximately 5-10 seconds oxygen concentration within the cell. Based on oxygen smooth trimming as part of the combustion control, abrupt drops in the oxygen analyzer's signal are analyzed and developed with a rate of change algorithm to provide a calibration-free reliable indication of unburned fuel (such as methane) and carbon monoxide detection in process. Embodiments described herein generally provide effective oxygen trimming options for efficient, reliable and safe combustion control, thereby facilitating diagnostics for process problems such as faulty burners, fuel/air mixing imbalances, and induced draft fans.

Although the present invention has been described with reference to preferred embodiments, workers skilled in the art will recognize that changes may be made in form and detail without departing from the spirit and scope of the invention.

What is claimed is:

1. An oxygen analyzer mountable within a source of combustion process gas, the oxygen analyzer comprising:
   a controller configured to receive an oxygen sensor signal, the controller being programmed to provide an oxygen concentration output;
   a probe configured to extend into the source of combustion process gas;
   an oxygen sensor disposed within the probe comprising:
   a solid electrolyte positioned on an end of the oxygen sensor;
   a sensing electrode mounted to one side of the solid electrolyte;
   a reference electrode mounted to an opposite side of the solid electrolyte;
   a plurality of catalytic beads that are configured to be disposed between a combustion process gas and the sensing electrode;
   a measurement circuitry operably coupled to the oxygen sensor and the controller, the measurement circuitry being configured to provide the controller with the oxygen sensor signal based on an electrical response of the oxygen sensor; and
   wherein the controller is configured to compare the oxygen sensor signal to at least one threshold to determine an ancillary condition to detect a behavior of the oxygen sensor concentration output over time and provide at least one ancillary output indicative of the ancillary condition.

2. The oxygen analyzer of claim 1, wherein the sensing electrode is a cermet sensing electrode.

3. The oxygen analyzer of claim 2, wherein the measurement circuitry is configured to measure a voltage across the cermet sensing electrode and a cermet reference electrode.

4. The oxygen analyzer of claim 2, wherein the cermet sensing electrode and the catalytic beads are formed at least partially of platinum.

5. The oxygen analyzer of claim 1, wherein the solid electrolyte is a layer of zirconia.

6. The oxygen analyzer of claim 1, wherein the solid electrolyte is a bulk ceramic.

7. The oxygen analyzer of claim 1, wherein the at least one ancillary output comprises a value indicative of the ancillary condition, wherein the ancillary condition is an alert of unburned fuel.

8. The oxygen analyzer of claim 1, wherein the at least one ancillary output comprises a value indicative of the ancillary condition, wherein the ancillary condition is an alert of carbon monoxide.

9. The oxygen analyzer of claim 1, wherein the ancillary output comprises a value indicative of the ancillary condition, wherein the ancillary output is communicated to a remote device to trigger a change in fuel to oxygen ratio relative to combustion.

10. The oxygen analyzer of claim 7, and further comprising a process communication circuitry operably coupled to the controller, the process communication circuitry being configured to transmit the ancillary output using process communication.

11. The oxygen analyzer of claim 1, wherein the controller is further configured to be programmed to calculate a concentration of a non-oxygen gas in the combustion process gas, based on the behavior of the oxygen sensor concentration output over time.

12. The oxygen analyzer of claim 1, wherein the at least one threshold is greater than 0.2% oxygen concentration and less than 0.5% oxygen concentration.

13. The oxygen analyzer of claim 12, wherein the ancillary condition is carbon monoxide in combustion flue gas.

14. The oxygen analyzer of claim 1, wherein the controller is further configured to calculate a concentration of carbon monoxide in the combustion flue gas.

15. The oxygen analyzer of claim 14, wherein the controller is further configured to report the concentration of carbon monoxide in the combustion flue gas to a remote device to trigger a change in fuel to oxygen ratio relative to combustion.

16. An oxygen analysis system comprising:
- a probe configured to extend into a source of combustion process gas;
- an oxygen sensor disposed within the probe comprising:
  - a solid electrolyte positioned on an end of the oxygen sensor;
  - a sensing electrode mounted to one side of the solid electrolyte;
  - a reference electrode mounted to an opposite side of the solid electrolyte;
  - a plurality of catalytic beads that are configured to be disposed between a combustion process gas and the sensing electrode;
- a controller configured to receive an oxygen sensor signal from the oxygen sensor, the controller being programmed to provide an oxygen concentration output;
- a measurement circuitry operably coupled to the oxygen sensor and the controller, the measurement circuitry being configured to provide the controller with the oxygen sensor signal based on an electrical response of the oxygen sensor; and
- wherein the controller is configured to compare the oxygen sensor signal to at least one threshold to determine an ancillary condition to detect a behavior of the oxygen sensor concentration output over time and provide at least one ancillary output indicative of the ancillary condition.

17. The oxygen analysis system of claim 16, wherein the ancillary condition is an alert of unburned fuel.

18. The oxygen analysis system of claim 17, wherein the unburned fuel is methane.

19. The oxygen analysis system of claim 16, wherein the at least one threshold is greater than 0.5% oxygen concentration and the ancillary condition is unburned fuel.

20. The oxygen analysis of claim 19, wherein the controller is further configured to calculate a concentration of the unburned fuel.

* * * * *